(12) United States Patent
Schneidmiller et al.

(10) Patent No.: US 8,402,690 B2
(45) Date of Patent: Mar. 26, 2013

(54) BEDBUG TRAP

(75) Inventors: Rodney G. Schneidmiller, Greenacres, WA (US); Qing-He Zhang, Spokane Valley, WA (US)

(73) Assignee: Sterling International Inc., Spokane, WA (US)

( * ) Notice: Subject to any disclaimer, the term of this patent is extended or adjusted under 35 U.S.C. 154(b) by 226 days.

(21) Appl. No.: 12/878,870

(22) Filed: Sep. 9, 2010

(65) Prior Publication Data
US 2012/0060406 A1    Mar. 15, 2012

(51) Int. Cl.
*A01M 1/10*    (2006.01)
(52) U.S. Cl. ............................................. 43/123; 43/121
(58) Field of Classification Search .................... 43/123, 43/107, 121, 114
See application file for complete search history.

(56) References Cited

U.S. PATENT DOCUMENTS

| | | | |
|---|---|---|---|
| 38,277 A | 4/1863 | Bassett | |
| 149,918 A | 4/1874 | Clough | |
| 161,032 A | 3/1875 | Hawkins | |
| 161,814 A | 4/1875 | Nelson | |
| 501,350 A * | 7/1893 | Kuntz | 43/121 |
| 722,143 A | 3/1903 | Raymond | |
| 836,052 A | 11/1906 | Pool | |
| 862,079 A | 7/1907 | Lenthier | |
| 869,556 A | 10/1907 | De Haas | |
| 1,024,767 A * | 4/1912 | Dempster | 43/121 |
| 1,131,120 A | 3/1915 | Crawford | |
| 1,139,717 A | 5/1915 | Pipenhagen | |
| 1,221,098 A | 4/1917 | Shackelford | |
| 1,231,877 A | 7/1917 | Goodrum, Jr. | |
| 1,247,724 A | 11/1917 | Sassenhoff | |
| 1,277,354 A | 9/1918 | Arabian | |
| 1,286,423 A | 12/1918 | Saffry | |
| 1,415,801 A | 5/1922 | Corle | |
| 1,496,135 A | 6/1924 | Schwiening | |
| 1,544,334 A | 6/1925 | Martin | |
| 1,586,630 A | 6/1926 | Lee | |
| 1,715,958 A | 6/1929 | Strand | |
| 1,716,196 A | 6/1929 | Swanson | |
| 1,723,208 A | 8/1929 | Raj | |
| 1,846,851 A | 2/1932 | Dodge | |
| 1,858,087 A | 5/1932 | Howard | |
| 2,100,909 A * | 11/1937 | Mora | 43/121 |

(Continued)

FOREIGN PATENT DOCUMENTS

| JP | 03091431 A * | 4/1991 |
|---|---|---|
| JP | 8-322448 A | 12/1996 |

(Continued)

*Primary Examiner* — Darren W Ark
*Assistant Examiner* — Kathleen Iwasaki
(74) *Attorney, Agent, or Firm* — Christensen O'Connor Johnson Kindness PLLC

(57) ABSTRACT

A bedbug trap having a base with an outer wall that may be formed as an angled ramp having a relatively shallow angle that leads to an entryway, and an inner wall extending from the outer wall that may be formed as an angled chute having a relatively steep angle. The ramp may be textured or otherwise skid-resistant, and the chute is smooth. A catch container attaches underneath the base and has a floor spaced away from the chute. A source of attractant, for example, an insulated container containing dry ice, rests on the base such that at least a portion of attractant from the container will flow toward the top of the ramp. A cover may attach to the base, enclosing the insulated container.

11 Claims, 12 Drawing Sheets

U.S. PATENT DOCUMENTS

| | | |
|---|---|---|
| 2,193,492 A | 3/1940 | Richardson |
| 2,478,104 A | 8/1949 | Johnson |
| 2,490,180 A | 12/1949 | Varnedoe, Jr. |
| 2,608,022 A | 8/1952 | Wright |
| 3,059,373 A | 10/1962 | Gardner |
| 4,212,129 A | 7/1980 | Shumate |
| 4,244,135 A | 1/1981 | Harwoods |
| 4,423,564 A * | 1/1984 | Davies et al. ............... 43/121 |
| 4,551,941 A | 11/1985 | Schneidmiller |
| 5,090,153 A * | 2/1992 | Mullen et al. ............... 43/114 |
| 5,123,202 A | 6/1992 | Tanisake |
| 5,184,417 A | 2/1993 | Weldon |
| 5,231,791 A | 8/1993 | Falkson |
| 5,231,792 A | 8/1993 | Warner |
| 5,274,949 A | 1/1994 | Beaton |
| 5,323,556 A | 6/1994 | Carle |
| 5,339,563 A | 8/1994 | Job |
| 5,392,560 A | 2/1995 | Donahue |
| 5,522,171 A | 6/1996 | Mandeville |
| D372,513 S | 8/1996 | Schneidmiller |
| 5,557,880 A | 9/1996 | Schneidmiller |
| 5,842,305 A | 12/1998 | Liao |
| 5,987,809 A | 11/1999 | Cheok |
| 6,134,826 A | 10/2000 | Mah |
| 6,158,165 A | 12/2000 | Wilson |
| 6,289,629 B2 | 9/2001 | Greening |
| 6,425,202 B1 * | 7/2002 | Lin et al. ............... 43/107 |
| 6,502,347 B1 | 1/2003 | Carver, Sr. |
| 6,532,695 B1 | 3/2003 | Alvarado |
| 6,546,667 B1 | 4/2003 | Carter |
| 6,637,149 B1 | 10/2003 | Bauer |
| 6,722,080 B2 | 4/2004 | Carter |
| 6,910,298 B2 | 6/2005 | Schneidmiller |
| 6,920,716 B2 | 7/2005 | Kollars, Jr. |
| 7,412,797 B1 | 8/2008 | Hiscox |
| 7,743,552 B2 | 6/2010 | Borth |
| 7,785,450 B2 | 8/2010 | Maget |
| 2003/0167677 A1 | 9/2003 | Carter |
| 2004/0025412 A1 | 2/2004 | Simchoni |
| 2004/0128902 A1 | 7/2004 | Kollars, Jr. |
| 2005/0028430 A1 | 2/2005 | Schneidmiller |
| 2005/0279016 A1 | 12/2005 | Williams |
| 2006/0236592 A1 | 10/2006 | Hall, Jr. |
| 2007/0044371 A1 | 3/2007 | Meier |
| 2007/0044372 A1 | 3/2007 | Lang |
| 2009/0145020 A1 | 6/2009 | McKnight |
| 2009/0260276 A1 | 10/2009 | Kirsch |
| 2011/0047860 A1 * | 3/2011 | Black et al. ............... 43/123 |

FOREIGN PATENT DOCUMENTS

| | | |
|---|---|---|
| JP | 9-252700 A | 9/1997 |
| JP | 2000333581 A * | 12/2000 |
| WO | 99/26471 A | 6/1999 |
| WO | 99/26471 A1 | 6/1999 |

* cited by examiner

BEDBUG TRAP

BACKGROUND

Bedbugs are small, wingless, parasitic insects of the family Cimicidae. Bedbugs feed on the blood of warm-blooded animals including humans. Though not strictly nocturnal, bedbugs are mainly active at night and are capable of feeding unnoticed on their hosts. Adults are about ¼ of an inch in length and are generally oval in plan form, with relatively flat bodies. Their color ranges from nearly white or a light tan to a deep brown or burnt orange. Recently ingested blood may appear as a dark red or black mass within the bedbug's body. Because they never develop wings, bedbugs cannot fly. When disturbed, bedbugs actively seek shelter in dark cracks and crevices.

Bedbug populations have resurged in recent years, particularly throughout parts of North America, Europe, and Australia. They are most commonly found in rooms where people sleep, and they generally hide nearest the bed or other furniture used for sleeping. Bedbugs are most active at night, but when hungry they will venture out during the day to seek a host. Their flattened bodies allow them to conceal themselves in cracks and crevices around the room and within furniture. Favored hiding sites include the bed frame, mattress, and box spring. Clutter around the room offers additional sites for these bugs to hide and increases the difficulty in eliminating bedbugs once they have become established. Thus there is an urgent need for efficient detection, trapping and monitoring tools to combat this serious pest.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A bedbug trap is disclosed that includes a base with an outer entry ramp disposed at a relatively shallow angle, and a chute extending from the ramp and disposed toward a catch container at a relatively steep angle. Entryways for bedbugs are defined at the intersection of the entry ramp and the chute. The catch container is bowl shaped, and is removably attached to the base such that the chute is spaced apart from the catch tray. A receptacle is provided directly above the base, and holds an insulated container with a lid. The insulated container is configured to contain dry ice such that carbon dioxide gas sublimating from the dry ice is expelled from the insulated container and flows towards the base entryway.

In an embodiment of the trap the entry ramp is frustoconical ramp defining an angle of not more than 45 degrees, and the chute is frustoconical defining an angle of not less than 60 degrees.

In an embodiment of the trap the entry ramp has a textured upper surface and the chute as a smooth upper surface.

In an embodiment of the trap the base includes (i) a lower base member that defines the entry ramp having upright panels that extend upwardly, and (ii) an upper base member that is configured to engage the upright panels to define the entryways by the spacing between the lower base member and the upper base member.

In an embodiment of the trap the upright panels define locking notches along an upper edge, and the upper base member defines locking notches along a lower edge, and the upright panel locking notches are sized and shaped to lockingly engage the upper base member locking notches.

In an embodiment of the trap, a downwardly open cover is configured to engage the base such that the base and cover enclose the insulated container, defining an annular space therebetween.

In an embodiment or the trap, a plurality of apertures are spaced about a lower portion of the cover such that a portion of the sublimated carbon dioxide gas flows outwardly through the plurality of apertures.

In an embodiment of the trap, the upper base member further comprises a plurality of slots disposed over the entryway, that are positioned to facilitate flow of carbon dioxide gas from the annular space between the cover and the insulated container to the entryway.

In an embodiment of the trap, the cover further comprises a first tab and the base further comprises a second tab, wherein first and second tabs are positioned to facilitate releasably locking the cover to the base, such that access to the insulated container is inhibited.

In an embodiment of the trap the base further comprises an annular wall disposed between the outer ramp and the chute, and wherein the catch tray threadably engages the annular wall.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
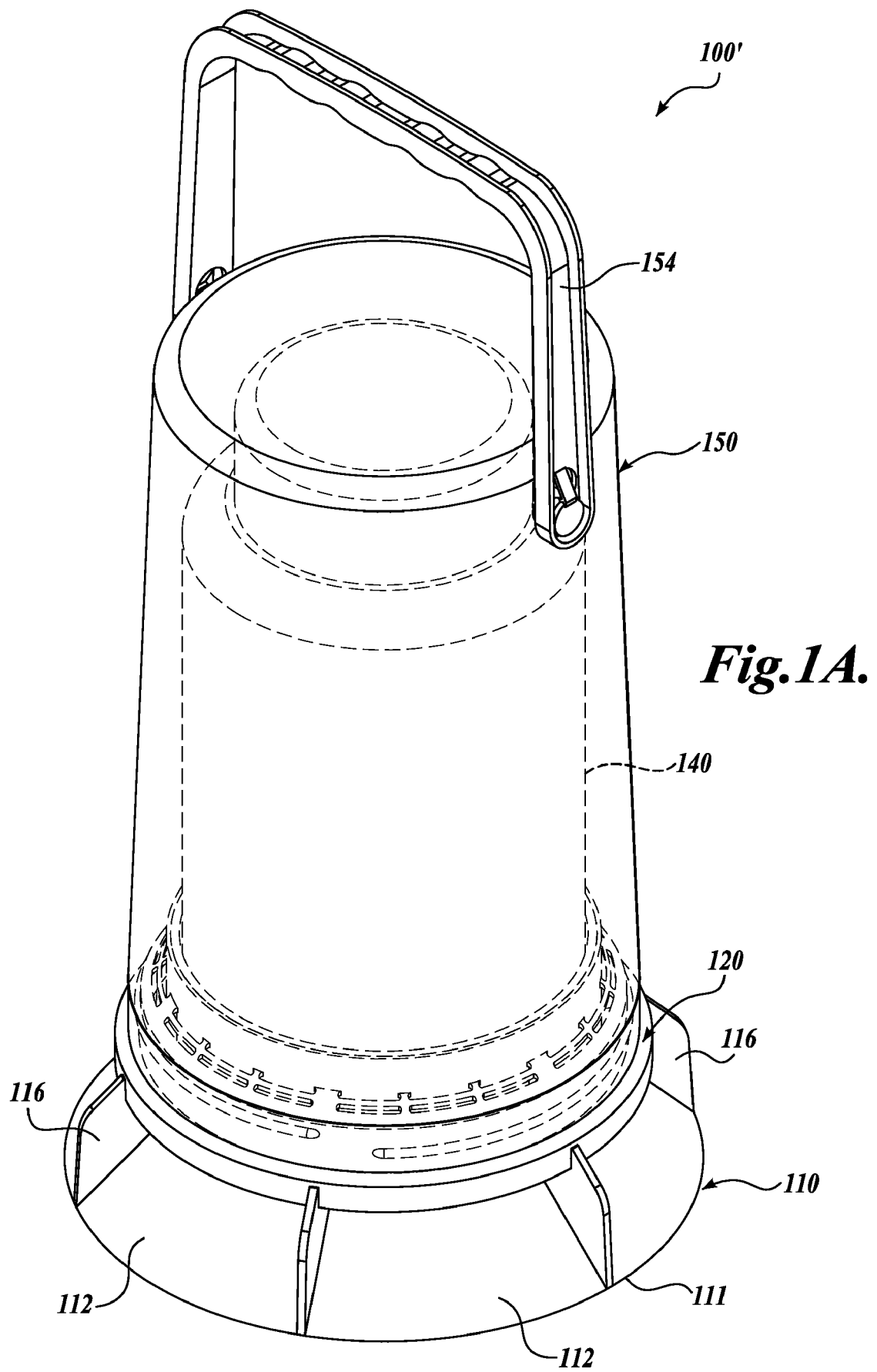
FIG. 1A is a perspective view of a first embodiment of a bedbug trap in accordance with the present invention.
Figure 1B:
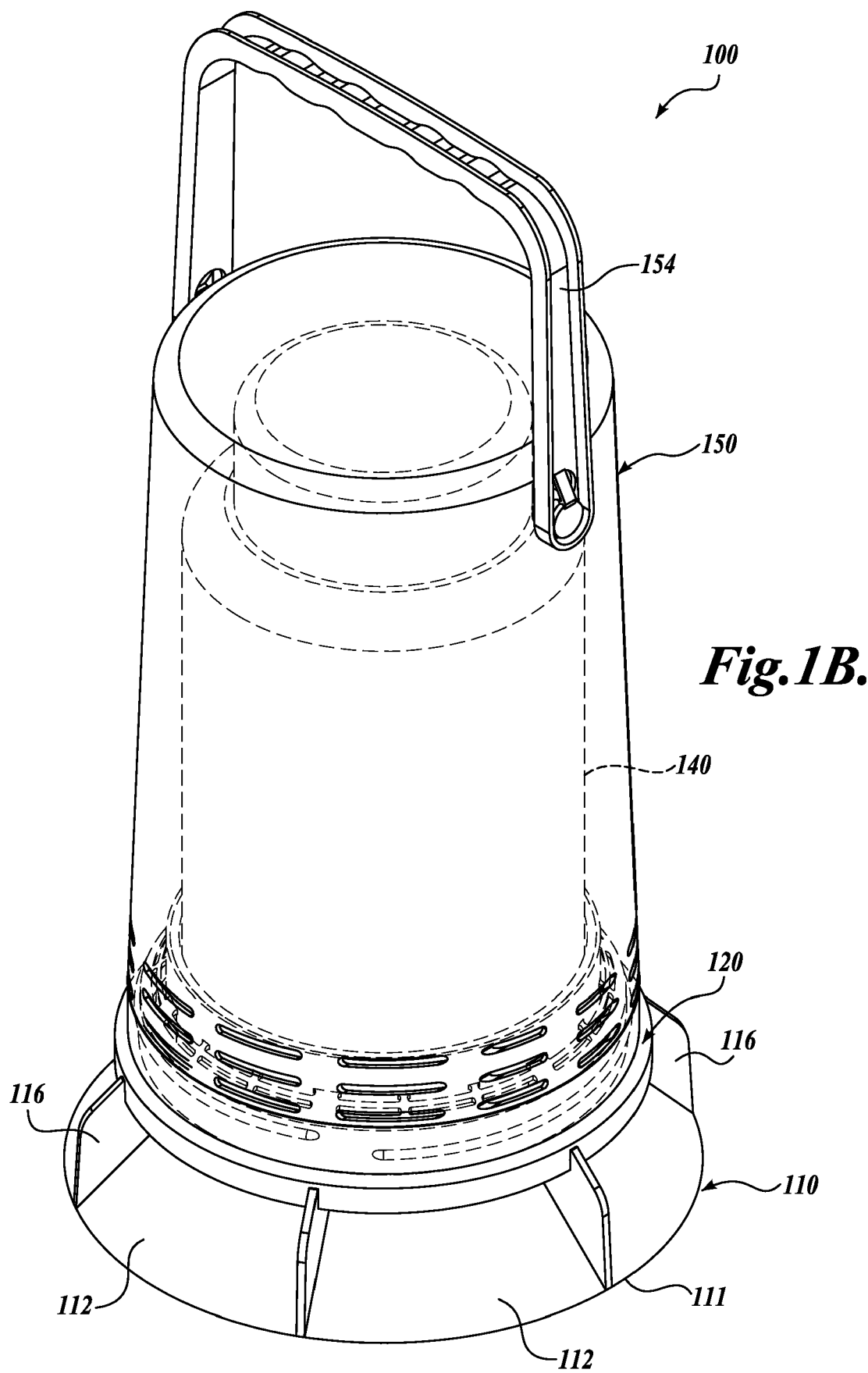
FIG. 1B is a perspective view of a second embodiment of a bedbug trap, similar to the embodiment in FIG. 1A, but having apertures near the bottom end of the cover.

A perspective view of a bedbug trap 100' in accordance with the present invention is shown in FIG. 1A, and a perspective view of a second embodiment of a bedbug trap 100, similar to the bedbug trap 100', but having slots 153 near the bottom of the cover assembly 150 is shown in FIG. 1B. The bedbug traps 100', and 100 are otherwise very similar, and so it is deemed sufficient to persons of skill in the art to describe only one of the traps in detail.

Figure 2:
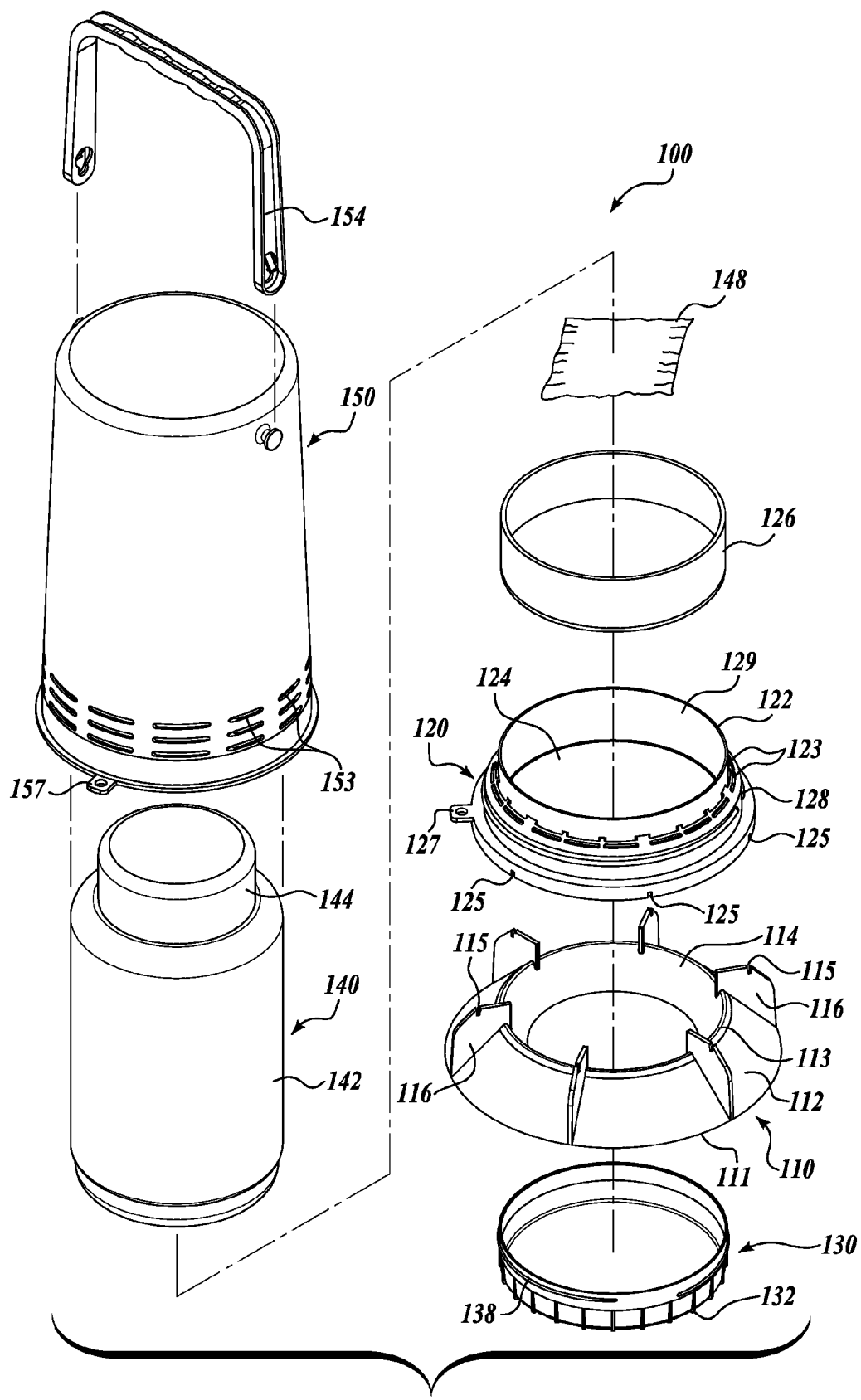
FIG. 2 is an exploded perspective view of the bedbug trap shown in FIG. 1B.
Figure 3:
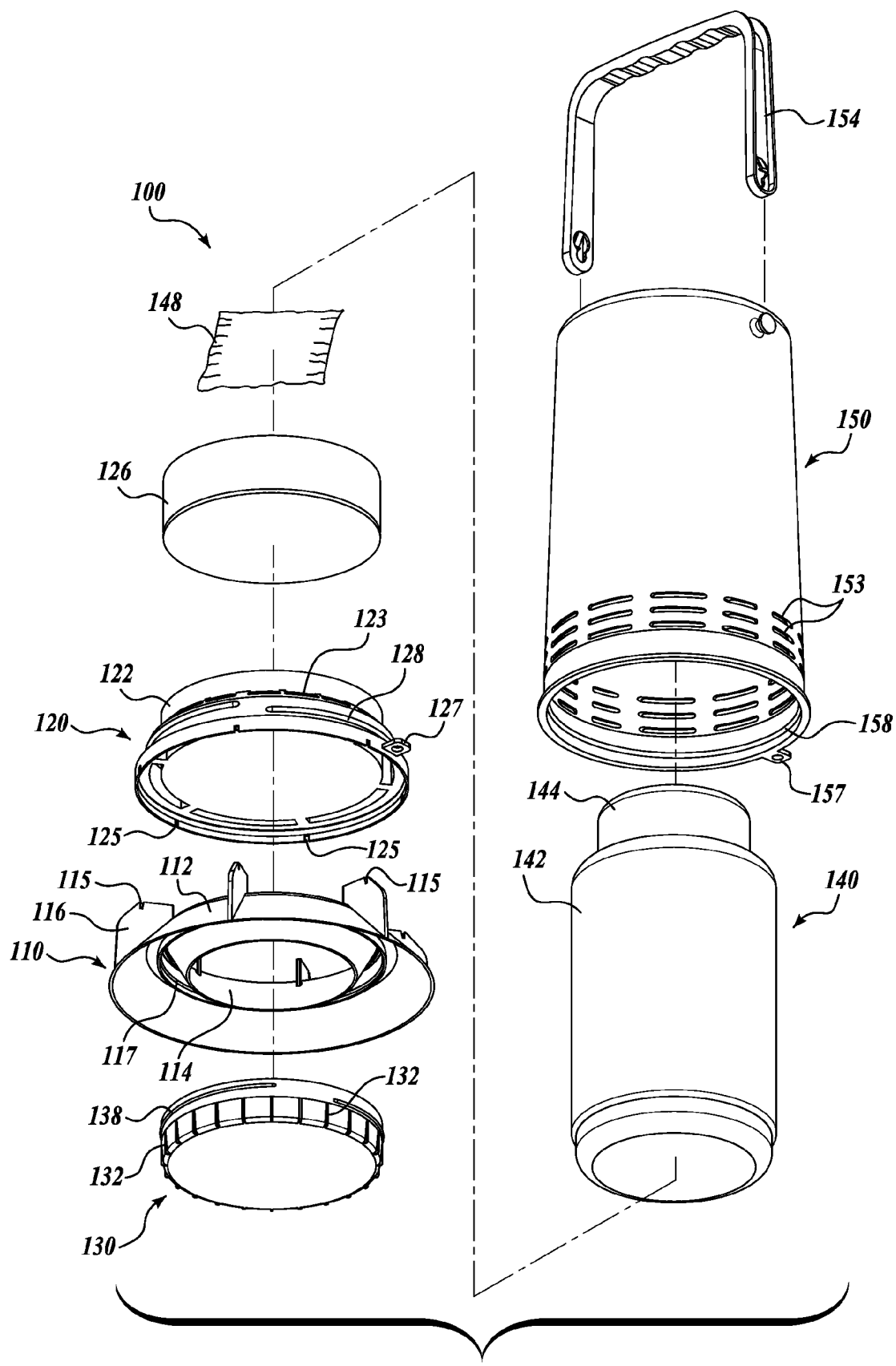
FIG. 3 is an exploded perspective view of the bedbug trap shown in FIG. 1B, from a lower angle.

An exploded view of the bedbug trap 100 is shown in FIG. 2 from an upper angle, and FIG. 3 is an exploded view of the bedbug trap 100 from a lower angle. In this embodiment the bedbug trap 100 includes a lower base member 110 and an upper base member 120 that engages the lower base member 110, and includes a receptacle 122 that is positioned to support an insulated container 140. A catch container 130 is positioned to receive and retain bedbugs that enter the trap 100. A cover assembly 150 is positioned over the insulated container 140 and engages the upper base assembly 120.

As seen most clearly in FIGS. 2 and 3, the lower base member 110 includes an outer entrance ramp 112 and an inner chute 114, which extends downwardly from the top of the entrance ramp 112. The entrance ramp 112 is generally frustoconical with a larger outer perimeter 111 that is generally planar so that the bedbug trap 100 may be readily supported on a flat surface. The inner chute 114 is also generally frustoconical, extending inwardly and downwardly from an upper edge 113 of the entrance ramp 112. A plurality of upright stanchions or panels 116 (six shown) extend upwardly from the entrance ramp 112. The panels 116 each define a notch 115 on an upper edge, which is discussed below. The entrance ramp 112 is preferably textured or otherwise configured to provide secure footing to bedbugs. In additional examples the entrance ramp may be coated or treated with a nonskid material or fabricated with closely space apertures. In a current embodiment the entrance ramp 112 is shaped such that when the trap 100 is placed on a horizontal surface the entrance ramp 112 will be disposed at an angle of not more than 50 degrees with respect to the horizontal surface, and preferably not more than 45 degrees (i.e., the frustoconical cone angle is not less than 80 degrees, and preferably not less than 90 degrees).

The frustoconical inner chute 114, in contrast, is fabricated to be very smooth. Optionally, the inner chute 114 may be treated or coated with a slippery material, for example, a talc powder, or the like. In a current embodiment the inner chute is shaped such that when the trap 100 is placed on a horizontal surface the chute will be disposed at an angle of not less than 50 degrees with respect to the horizontal surface, and more preferably not less than about 60 degrees (i.e., the frustoconical cone angle is not greater than 80 degrees, and preferably not greater than 60 degrees).

As seen most clearly in FIG. 3, the lower base member 110 includes an annular wall 117 that extends downwardly, between the entrance ramp 112 and the inner chute 114. The annular wall 117 is configured to receive the catch container 130 that is positioned to receive trapped bedbugs. In the current embodiment, the annular wall 117 has an internal thread that engages a corresponding thread 138 on the catch container 130. The catch container 130 is further provided with knurls 132 to facilitate attaching and removing the catch container 130.

The generally ring-shaped upper base member 120 is configured to releasably engage the lower base member 110. For example, in this embodiment a lower edge of the upper base member 120 includes a plurality of notches 125 that are sized and positioned to engage the notches 115 on the upright panels 116 of the lower base member 110. Preferably, the notches 115, 125 are shaped to produce a friction fit or interlocking fit such that when the upper and lower base members 110, 120 are assembled they will lockingly engage, and the upper and lower base members 110, 120 will tend to stay assembled, even when the bedbug trap 100 is lifted by a cover handle 154.

Referring now again to FIG. 2, the upper base member 120 includes the receptacle 122 that comprises a floor 124 and an annular upright wall 129. A plurality of circumferential slots 123 are provided in the upper base member 120 outwardly from the annular wall 129. The purpose of the circumferential slots 123 is discussed below. In this embodiment, the upper base member 120 further comprises a threaded portion 128 for attachment to the cover assembly 150. Optionally, a soft, absorbent liner 126, for example, felt, cloth, or the like, is provided in the receptacle 122 to absorb water that may condense on the insulated container 140 and/or on other parts of the trap 100 from humidity in the air.

The insulated container 140 includes a main body 142 and a lid 144 that is threadably attached to the body 142. The insulated container 140 may comprise a conventional thermos-type flask that contains a bedbug attractant, for example, frozen carbon dioxide (dry ice). In a current embodiment, the dry ice begins sublimating in the insulated container 140, such that the pressure in the container rises. To begin use, the lid 144 is very slightly unsealed. It will be appreciated that typically even when the lid 144 is tightly attached to the body 142, the pressure in the container 140 will typically cause some of the sublimated $CO_2$ gas to gradually escape from the insulated container 140, even through the tight space between the lid 144 and the opening of the container body. Although the current embodiment uses a conventional thermos-type insulated container, it will be appreciated that other insulated containers may be used, including, for example, a container having a pressure relief valve that opens depending on the pressure within the container.

The cover assembly 150 includes an inner thread 158 (FIG. 3) near its lower end that is configured to threadably engage the threaded portion 128 of the upper base member 120. In the embodiment of FIG. 1A the cover is closed except for the bottom opening that engages the base member 120. In the embodiment of FIG. 1B the cover assembly 150 further includes a plurality of apertures or slots 153 near the lower end of the cover assembly 150, to increase the release rate of carbon dioxide, if needed. If the optional slots 153 are included near the lower end of the cover assembly 150, it is contemplated that the slots 153 may be provided with an adjustable cover such that the slots 153 may be partially or fully blocked by the user.

The pivotable handle 154 is conveniently provided to facilitate placement of the trap 100. Optionally, the upper base member 120 has a tab 127 with a through aperture, and the cover assembly 150 includes a corresponding tab 157 with a through aperture. The tabs 127, 157 are configured such that the tabs may be positioned adjacent to each other when the trap 100 is assembled, such that the cover assembly 150 may be rotationally locked to the upper base member 120, for example, with a tie wrap, mechanical lock, bolt and nut, or the like (not shown). It will be appreciated that when the cover assembly is locked to the upper base member 120, the insulated container 140 is not directly accessible, providing protection from unintended third parties (e.g., children) from accessing the insulated container 140 and removing or loosening the lid 144, causing a risk of dry ice burns, and/or allowing more rapid sublimation of the dry ice.

In another optional aspect shown in FIGS. 2 and 3, a heat generating mechanism 148, for example an electrically-activated or a chemically-activated heating element, may be provided in or near the catch container 130 as an additional lure to bedbugs. Chemically-activated heating elements are known in the art. For example, some warmers contain cellulose, iron, water, activated carbon, vermiculite and slat to produce heat from the exothermic oxidation of iron when exposed to air. Other types generate heat through exothermic crystallization of supersaturated solutions, or react a liquefied petroleum gas with a platinum catalyst. Alternatively a battery-operated or corded heater may be used.

Although the components of the trap 100 may be formed by a variety of conventional methods, in a particular embodiment it is contemplated that the lower base member 110, upper base member 120, catch container 130, cover assembly 150, and handle 154 may all be formed by injection molding from conventional polymeric materials.

Figure 4:
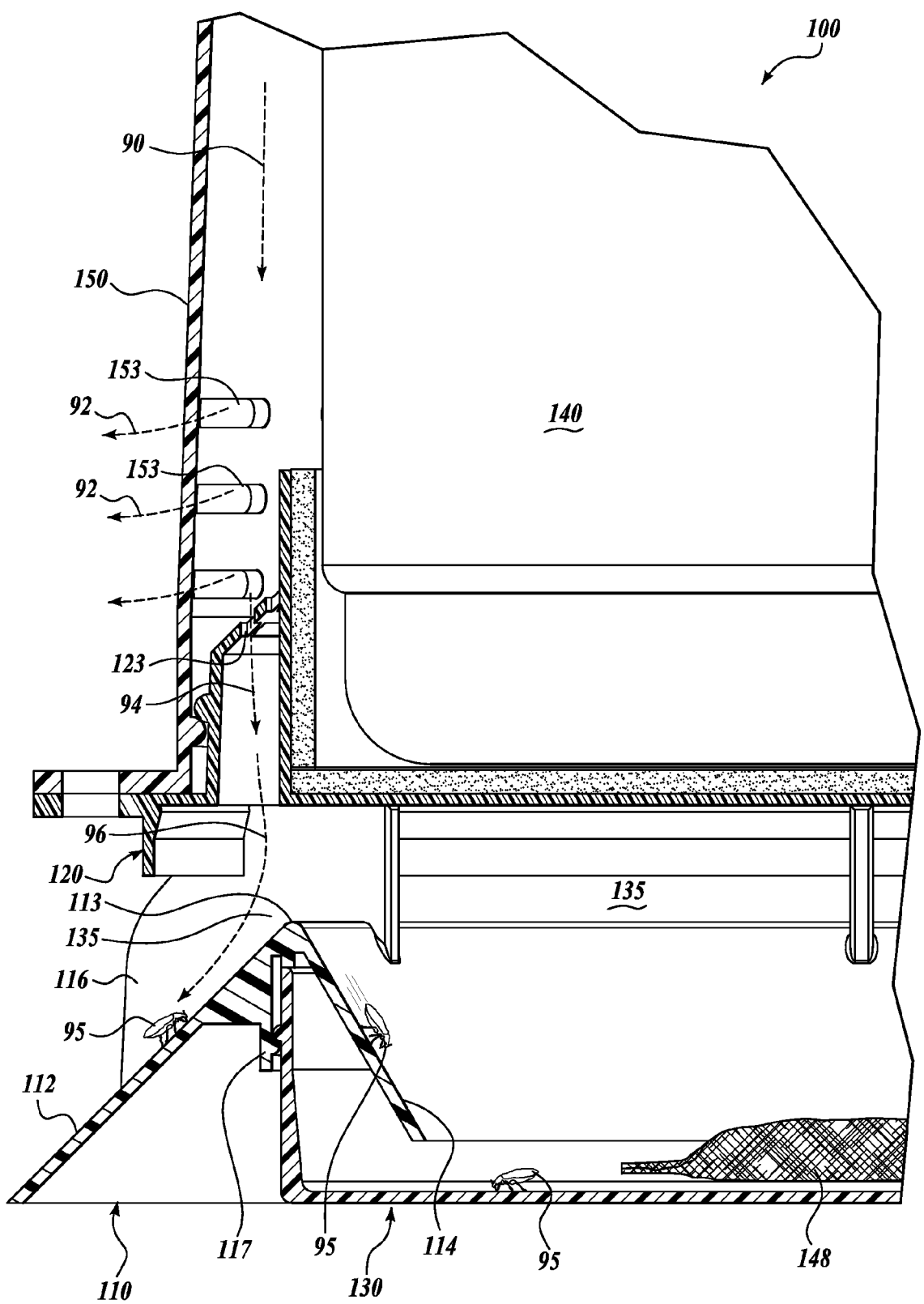
FIG. 4 is cross-sectional detail view of a portion of the bedbug trap shown in FIG. 1B showing the bedbug entryway and the flow path for the attractant.

FIG. 4 shows a cross-sectional view of a portion of the trap 100, showing a bedbug entryway 135 defined between the lower base member 110 and the upper base member 120. See also FIG. 5, which shows a cross-sectional view of the trap 100 taken through a mid-plane that contains two of the upright panels 116, and without the optional heating element 148. The upper base member 120 engages the upright panels 116 that extend upwardly from the entrance ramp 112 such that the entryway 135 is formed by the gap between the lower and upper base members 110, 120. It will be appreciated that an advantage of this construction is that the entryway 135 in this embodiment is open substantially for the entire three hundred sixty-degree perimeter of the lower base member upper edge 113.

Figure 5:
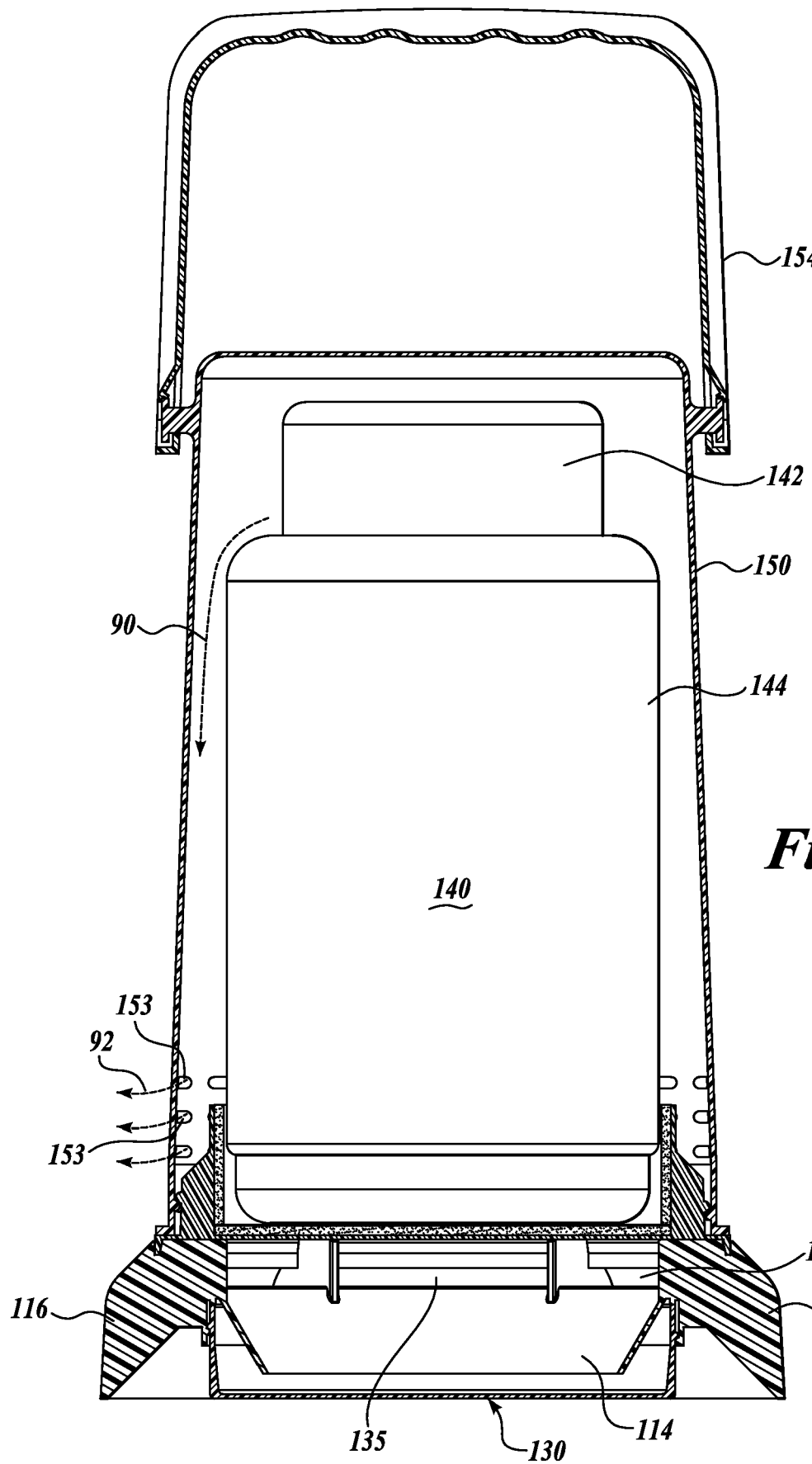
FIG. 5 is a cross-sectional view of a bedbug trap shown in FIG. 1B, taken through a mid-plane defined by two oppositely disposed upright panels of the lower base member.

The general flow of the attractant will now be described, with reference to FIGS. 4 and 5. Carbon dioxide gas escaping from near the lid of the container 140 is cold and heavier than the surrounding air. Therefore, the carbon dioxide gas will tend to flow downwardly in the annular volume between the container 140 and the cover assembly 150, as indicated by arrow 90. It is believed to be beneficial that the carbon dioxide gas exits the container some distance away from the entryways 135, such that the gas will partially warm before reaching the entryways 135. The target bedbugs 95 are therefore less likely to be deterred by the lower temperature at the entryways 135.

The carbon dioxide gas flows, at least in part, through the circumferential slots 123 in the upper base member 120, as indicated by arrows 94 (FIG. 4). These slots 123 are disposed directly above the entryways 135. The carbon dioxide gas passing through the upper base member slots 123 will therefore be in relatively high concentration near the entryways 135, to attract the bedbugs 95 thereto, and will continue to flow outwardly 96, providing an attractant trail of increasing carbon dioxide concentration leading to the entryways 135.

If the optional slots 153 are provided in the cover assembly 150, then a portion of the carbon dioxide gas may exit the trap 100 through the slots 153, as indicated by arrows 92. The optional slots 153 are disposed around the lower perimeter of the cover 140 to increase the overall release rate of carbon dioxide from the trap, to attract bedbugs 95 from a relatively longer range. In either case, the outflow of gas proceeds flow in all directions away from the trap 100, so the concentration of the carbon dioxide gas will naturally increase in the direction towards the trap 100. In the embodiment without the optional slots 153, substantially all of the carbon dioxide gas is released from the entryways 135 via the slots 123.

Because carbon dioxide is a known attractant to bedbugs, it will now be appreciated that bedbugs 95 will be attracted towards the trap 100 from a distance by the flow of carbon dioxide gas. As the bedbugs 95 come into closer proximity to the trap 100, higher concentrations of carbon dioxide gas will be detected from the entryways 135. The attracted bedbugs 95 may therefore proceed up the entrance ramp 112, which is oriented at a relatively shallow angle and is textured or otherwise formed to provide an easy path for the bedbug 95. As the bedbug crests the upper edge 113 of the lower base member 110, the relatively steep and smooth inner chute 114 will allow the bedbug 95 to slide down into the catch container 130. Even if the bedbug 95 is able to avoid immediately sliding down the chute 114, the slippery surface of the inner chute 114 will hinder or prevent the bedbug 95 from exiting the trap 100. It will be appreciated from FIG. 4, that once the bedbug 95 is in the catch container 130, exit is virtually impossible because the inner chute 114 is spaced away from the floor of the catch container 130, and the walls of the catch container abut the lower base member 110.

Although dry ice/carbon dioxide is believed to be an effective attractant, it is contemplated that other attractants (chemical lures) may additionally be added in the container 140. Additionally, or alternatively, as indicated in FIGS. 2-4, a heating element 148 may provide a thermal lure.

Figure 6:
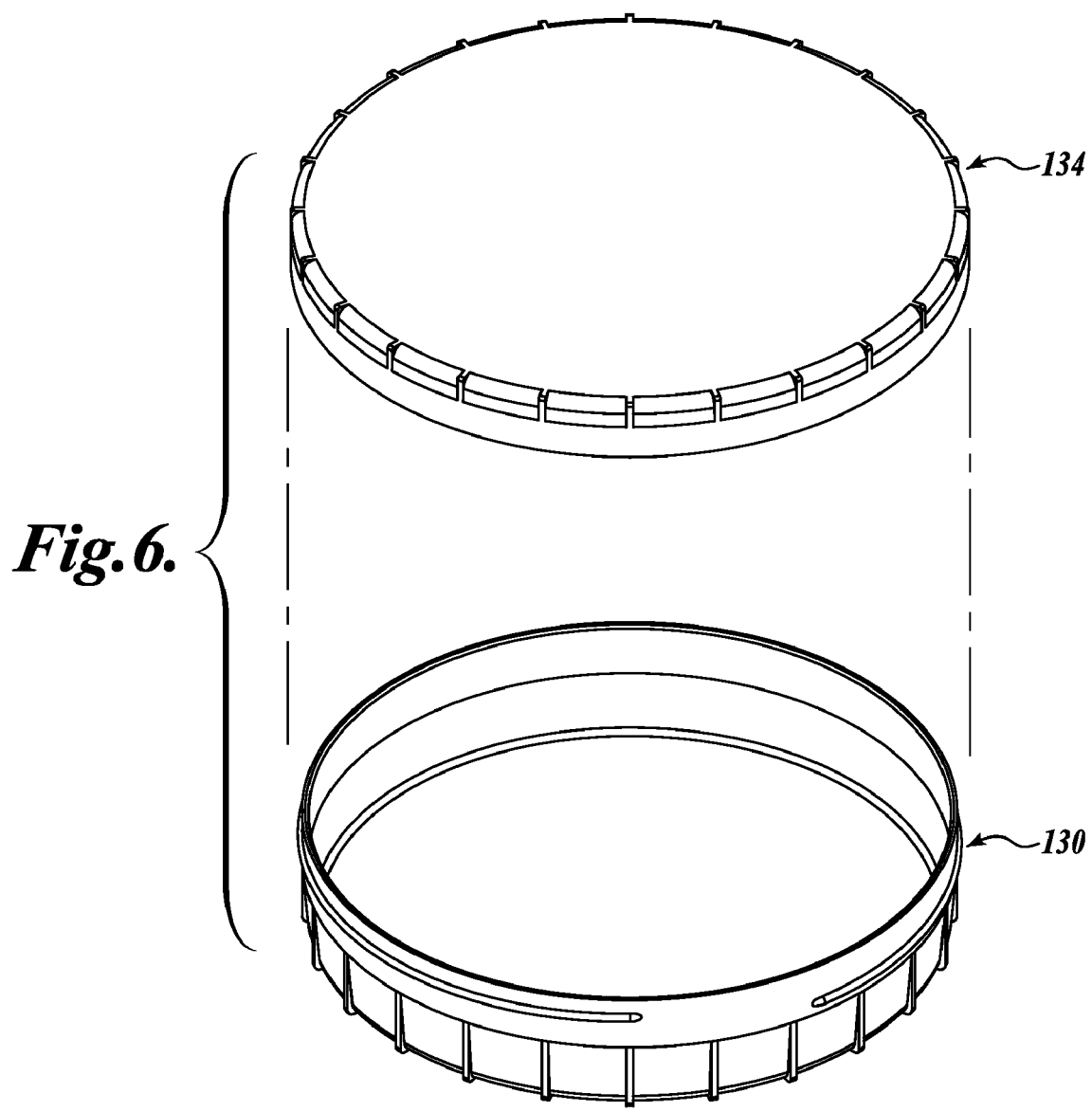
FIG. 6 is a perspective view of the catch container for the bedbug trap shown in FIG. 1B, and further showing the optional lid.

FIG. 6 shows the catch container 130 with an optional lid 134. When a trap 100 is found to contain bedbugs 95, the user may simply remove the catch container 130 from the trap 100, optionally installing a second catch container 130 on the trap 100, and then dispose of the bedbug(s) 95. Optionally, the user may fix the lid 134 to the container 130 containing the bedbugs, and label it with date, location (e.g., address, room number, etc.), and any other desired information for recording, documentation, analysis and/or reporting purposes. In a current embodiment, the catch container 130 and/or at least portions or all of the cover 150 and/or base members 110, 130 are formed from a transparent material so that the user can determine if bedbugs are trapped without removing the catch container 130.

Figure 7:
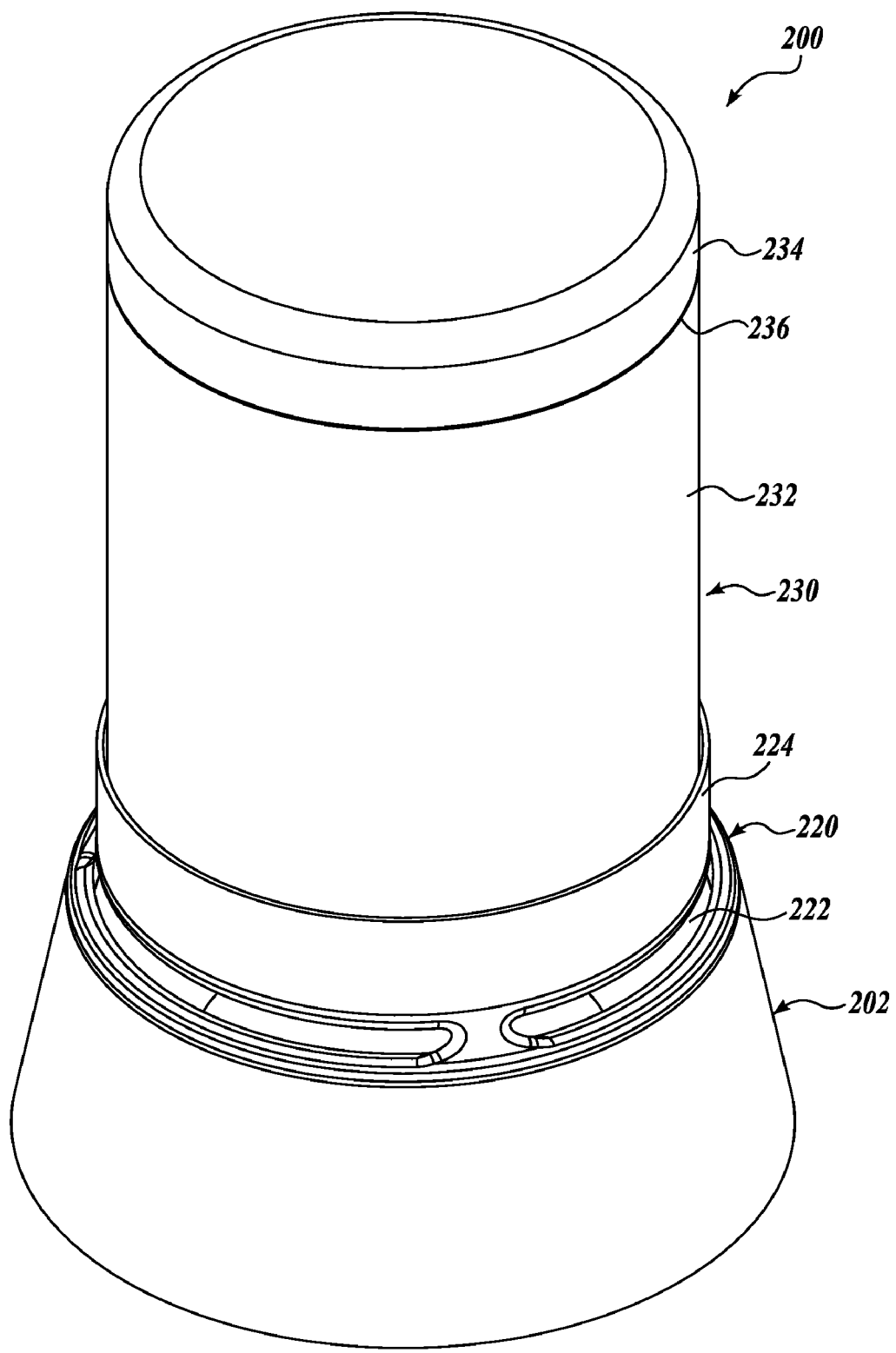
FIG. 7 is a perspective view of a third embodiment of a bedbug trap in accordance with the present invention.
Figure 8:
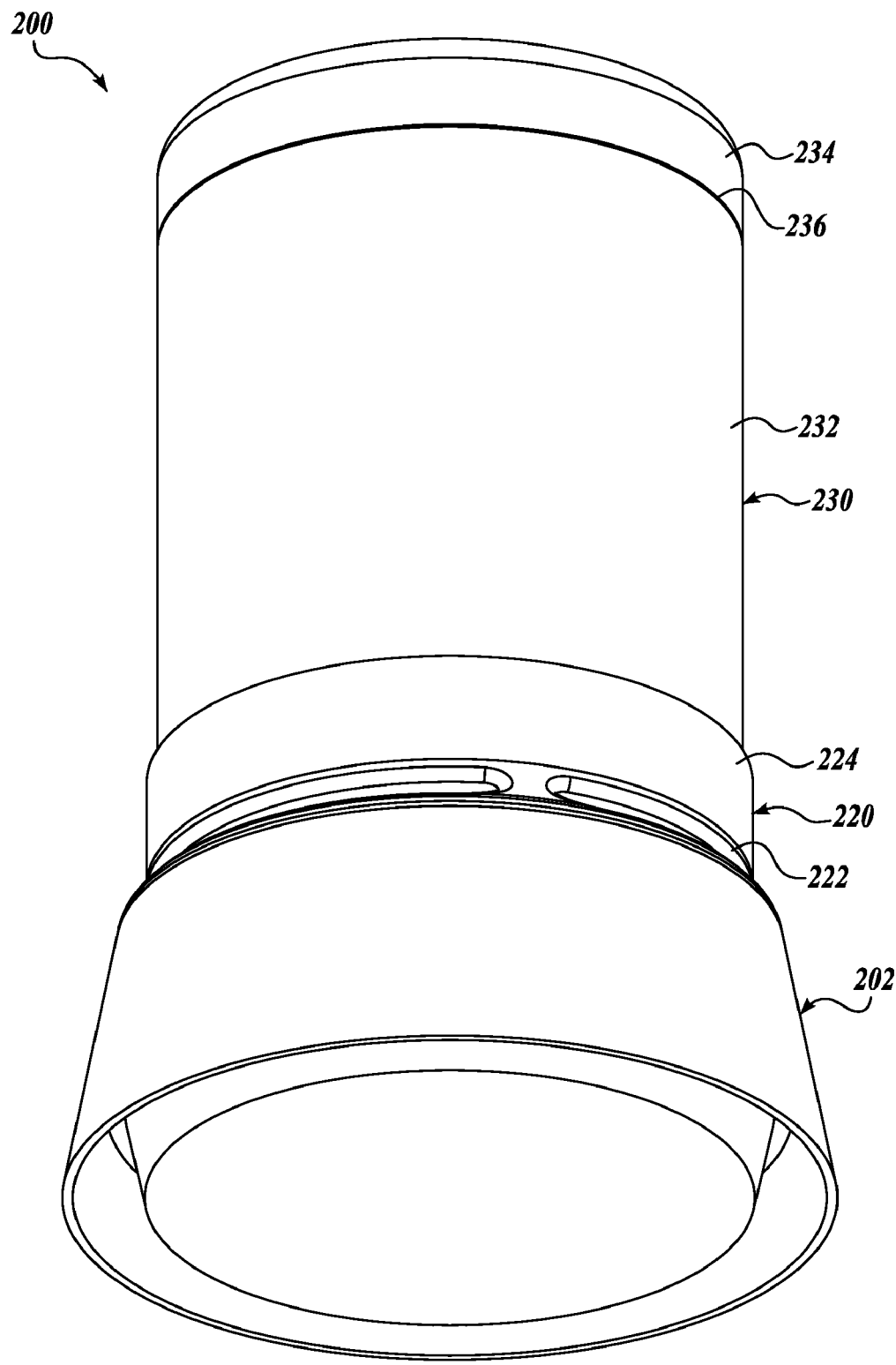
FIG. 8 is a lower perspective view of the bedbug trap shown in FIG. 7.

A perspective view of a second embodiment of a bedbug trap 200 in accordance with the present invention is shown in FIG. 7, and another perspective view of the bedbug trap 200 is shown in FIG. 8. In this embodiment, the bedbug trap 200 includes a base 202 that is preferably adapted to be placed on a flat surface, such as a nightstand, mattress or floor. An intermediate entry structure 220 provides a plurality of entryways 222 into the trap 200. The entry structure 220 includes an upper receptacle portion 224 that is configured to receive a cylindrical canister 230. The canister 230 includes a container 232, open at the top, and a lid 234 that is adapted to cover the open top of the container 232.

During use, the container 232 is preferably provided with a quantity of frozen carbon dioxide (dry ice) that will sublimate and act as an attractant to bedbugs. Although the dry ice is believed to be an effective attractant, it is contemplated that other attractants may additionally be added in the container 232. In the currently preferred embodiment the canister 230 is insulated, to slow the sublimation of the dry ice. For example, the canister 230 may include an inner insert layer of insulative material such as a polymeric foam, or the canister 230 may be formed as a double-walled container with an insulative material, gas, or vacuum therebetween. The lid 234 is movable between a sealed position and an unsealed position. When the lid 234 is in the unsealed position a narrow opening is provided at the slot 236 defined between the container 232 and the lid 234 that is sufficient to permit gaseous carbon dioxide to seep out of the container 232.

Figure 9:
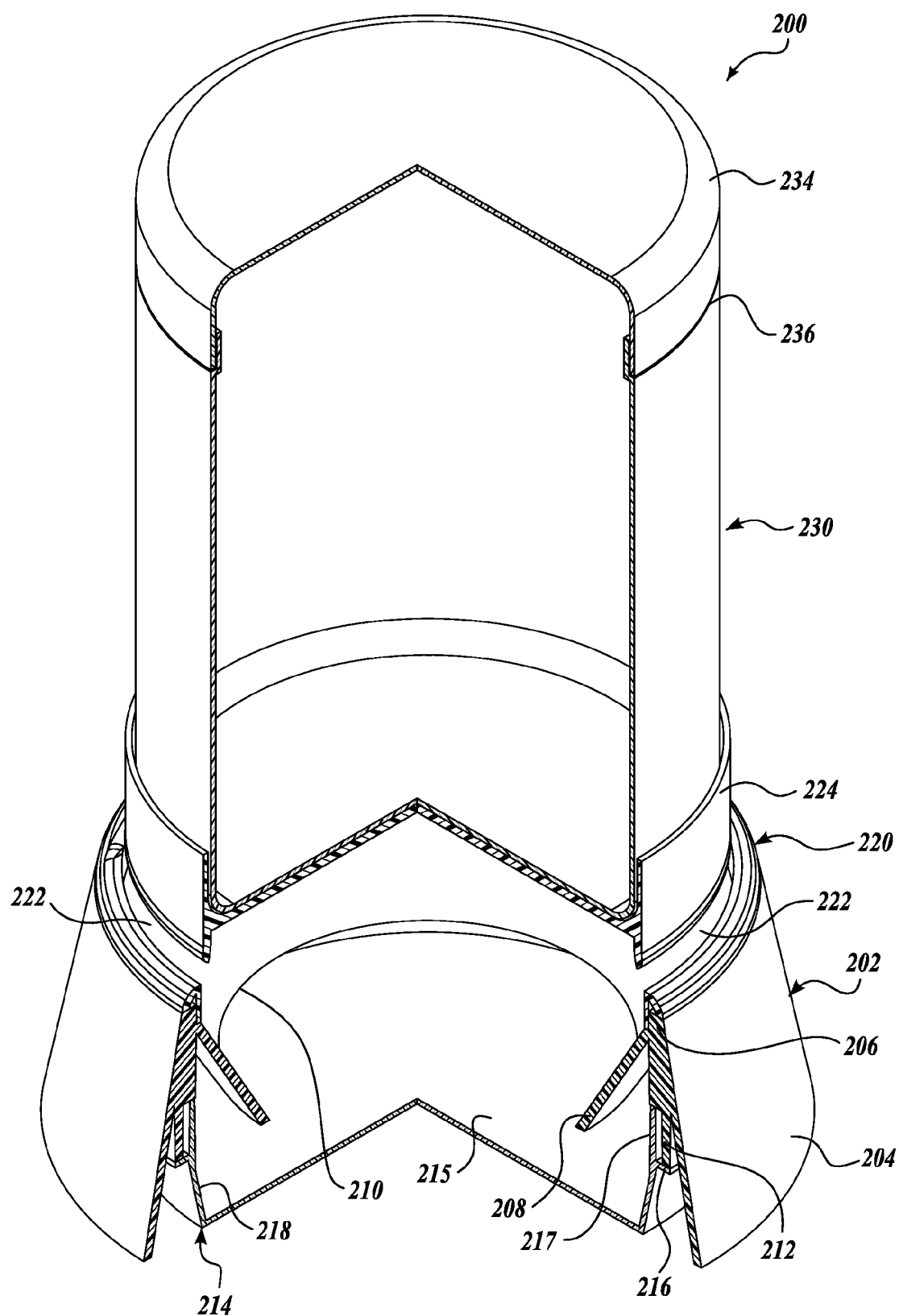
FIG. 9 is a partially cutaway perspective view of the bedbug trap shown in FIG. 7.
Figure 10:
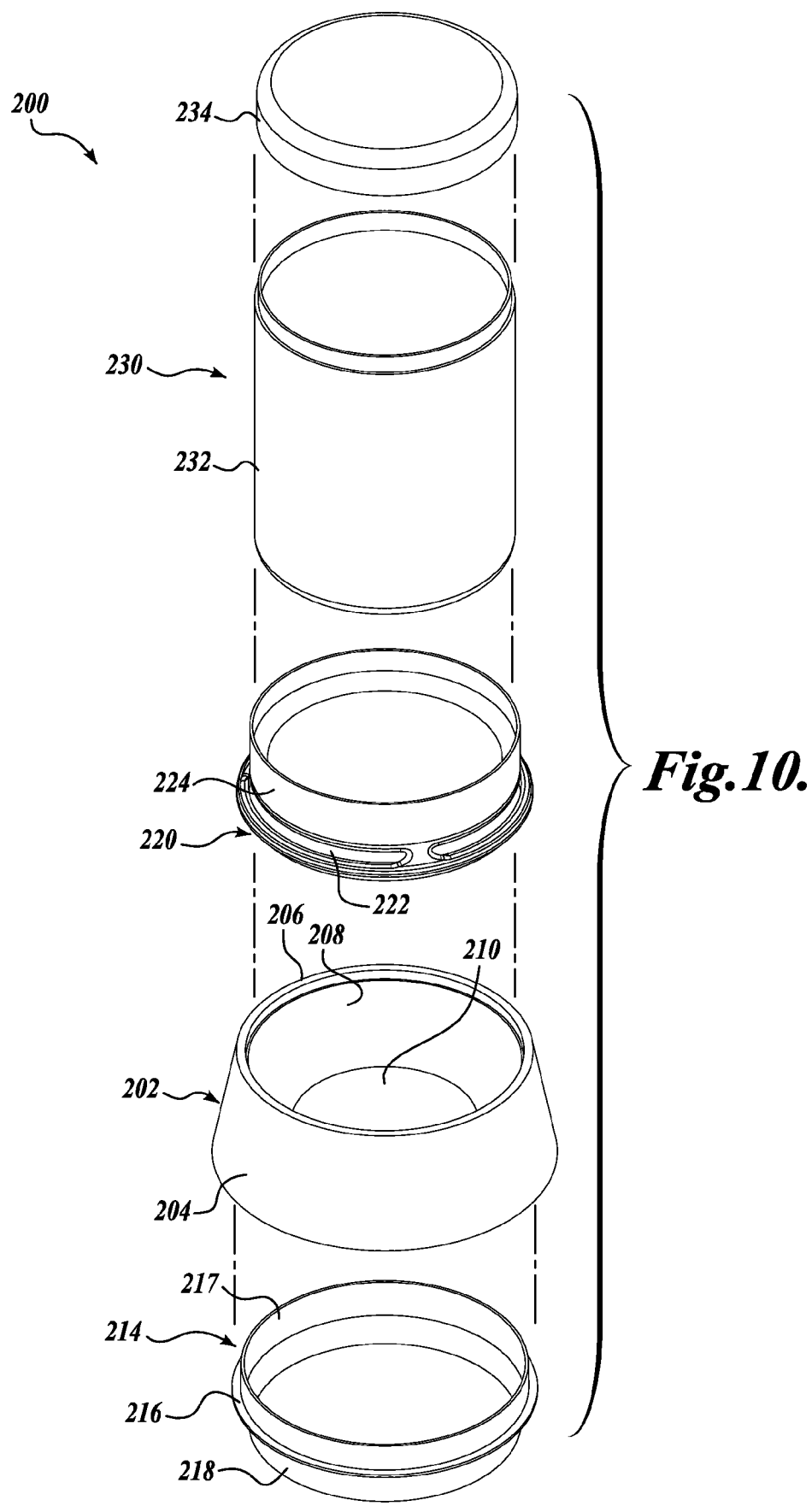
FIG. 10 is an exploded perspective view of the bedbug trap shown in FIG. 7.
Figure 11:
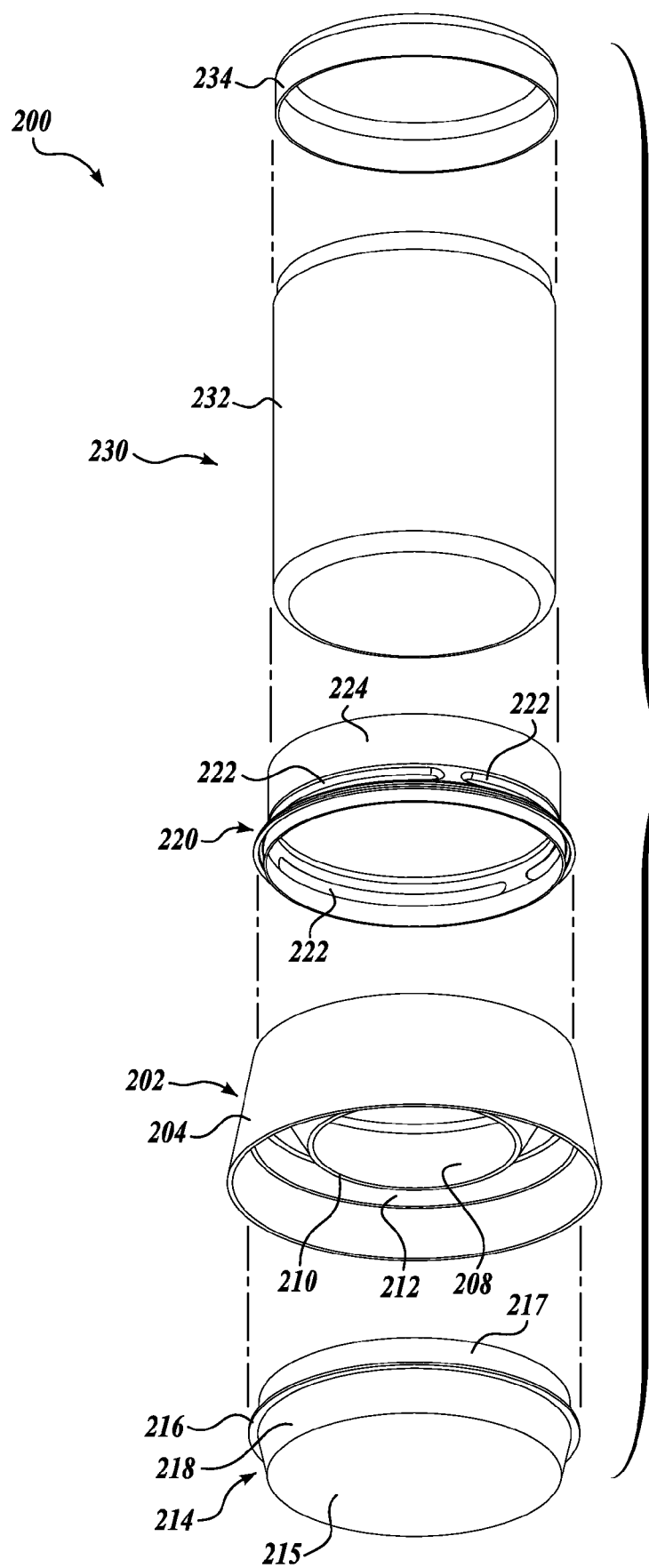
FIG. 11 is an exploded lower perspective view of the bedbug trap shown in FIG. 7.

Refer now also to FIGS. 9-11. FIG. 9 shows a partially cutaway view of the bedbug trap 200. FIGS. 10 and 11 show exploded views of the bedbug trap 200. The base 202 comprises a frustoconical outer wall 204 that tapers upwardly towards the entry structure 220. The outer wall 204 outwardly facing surface is textured and/or otherwise configured to facilitate the ability of bedbugs to climb the outer wall 204.

For example, the outer wall 204 may optionally be provided with an outer nonskid coating. The top end of the outer wall 204 defines a generally circular rim 206 that is sized to receive and retain the entry structure 220.

The base 202 further comprises a frustoconical inner wall 208 extending downwardly and inwardly from the rim 206. The inner wall 208 defines a relatively large aperture 210 at its distal end. The inner wall 208 inwardly facing surface is smooth, and may optionally include a coating to enhance the slippery quality of the inner wall 208, such that a bedbug on the inner wall 208 would tend to slide downwardly toward the aperture 210. For example, the inner wall 208 may be treated with an oil- or silicone-based spray.

A middle wall 212 is disposed between the outer wall 204 and the inner wall 208. The middle wall 212 may be substantially cylindrical and is configured to engage a catch tray 214. The catch tray 214 is generally bowl-shaped with a floor 215 and an upright wall 218. The floor 215 is preferably configured to be approximately co-planar with the bottom of the base outer wall 204 when the trap 200 is assembled. An annular flange 216 extends outwardly from an intermediate height of the upright wall 218.

In the present embodiment, the annular flange 216 is positioned to abut a lower end of the base middle wall 212 when the trap 200 is assembled. Preferably, the catch tray 214 is releasably attached to the base 202, for example, with a friction fit, threaded attachment, or other engagement mechanism, such that when the base 202 is lifted from a support surface (not shown) the catch tray 214 will remain engaged by the base 202. In a current embodiment, the catch tray 214 is at least partially transparent, such that a user can lift the base 202 and view the catch tray 214 from below to check the trap 200 for bedbugs.

As can be seen most clearly in FIG. 9, the inner wall 208 of the base 202 extends downwardly into the catch tray 214, extending beyond an upper portion 217 of the upright wall 218.

The entry structure 220 is positioned over the base 202 and may be removably attached to the base 202, for example, with a friction fit, threadable engagement, or the like. The apertures or entryways 222 are located very near the top of the base 202 (i.e., near the bottom of the entry structure 220) to encourage bedbugs to pass through the entryways 222. As seen most clearly in FIG. 9, the entryways 222 are disposed radially outwardly from the receptacle portion 224 of the entry structure 220, and the entryways 222 are, at least in part, open upwardly. The upwardly open construction of the entryways 222 provides two advantages. First, bedbugs may more readily enter the trap 200 because the open configuration may be perceived as less hazardous. Second, the upwardly open entryways 222 facilitate entry of the heavier carbon dioxide gas into the entrapment area, e.g., the catch tray 214.

The receptacle portion 224 of the entry structure 220 provides a cup-shaped holder that is configured to receive and support the canister 230 directly over the entry structure 220. The canister 230 is removably received by the receptacle portion 224 and may be sized slightly smaller than the inside diameter of the receptacle portion 224, so as to be easily removed and replaced, or it may more closely match the inner diameter of the receptacle wall 224 to produce an interference fit, for example. Other options, such as a threaded attachment, keyed fit, or the like, may alternatively be used, as will be apparent to persons of skill in the art.

To assemble the trap 200, the catch tray 214 engages the base 202 from the underside, and the entry structure 220 engages the base 202 from the upper side. The insulated canister 230 containing the quantity of dry ice is then place on the receptacle portion 224 of the entry structure 220. The trap 200 may be placed wherever it is desired to trap bedbugs.

The lid 234 of the canister is then moved from the sealed position to the open position, such that sublimated carbon dioxide gas from the dry ice will seep out of the slot 236 between the container 232 and the lid 234. The cold carbon dioxide gas is heavier than the surrounding air and will, therefore, tend to flow downwardly toward the entryways 222.

As mentioned above, the entryways 222 are upwardly open. The entryways 222 are also disposed radially outwardly from the canister 230, and in particular the slot 236, such that the downwardly flowing carbon dioxide will tend to flow towards the entryways 222 and at least a portion of the gas will flow and/or diffuse through the entryways 222. It will also be appreciated that the slot 236 is disposed a distance away from the entryways 222, approximately by a distance equal to the height of the canister 230. Therefore, the carbon dioxide outflow from the canister (e.g., at the slot 236) is disposed a significant distance from the entryways 222, such that the sublimated carbon dioxide gas exiting the slot 236 will typically be warmed by the ambient surroundings prior to encountering the entryways 222.

It is contemplated that the traps 100, 200 may be used as a monitor, for example, as a bedbug detector to regularly check for the presence of bedbugs by trapping one or a few bedbugs. For example, in a hotel, motel, senior home, or other environment where bedbugs may find a desirable habitat, the trap 100, 200 may be periodically placed overnight in a suitable location for trapping bedbugs. If any bedbugs are found in the trap 100, 200 the user can undertake measures (for example, steaming or other eradication measures) to eliminate the bedbugs before a more serious infestation can develop.

As discussed above, the currently preferred bedbug trap conveniently utilizes carbon dioxide gas that is obtained from the sublimation of dry ice. However, other methods are known for producing carbon dioxide, which may alternatively be used. For example, U.S. Pat. No. 7,785,450, to Maget, which is hereby incorporated by reference in its entirety, discloses an on-site carbon dioxide generator that includes a stack of electrochemical cells that decompose organic carboxylated compounds into carbon dioxide and hydrogen gas. It is contemplated by the present invention that the source of carbon dioxide or other attractant may comprise other known systems, including systems using organic sources for carbon dioxide.

Although the currently preferred construction comprises discrete components that are assembled to form the traps 100, 200, it will be appreciated that various components may be combined in fewer components or divided into more and smaller components. For example, the slippery inner wall 208 on the base 202 in the present embodiment may alternatively be incorporated directly into the catch tray 214. As discussed above, it is also contemplated that a heating element, for example, a chemical or electrical heating element, may be provided (e.g., in the catch tray) to further lure bedbugs toward the trap. It is also contemplated that other attractants or chemical lures may be added in the container 214. It will be obvious to persons of skill in the art that the particular plan form shape of the trap may be altered without departing from the present invention. For example, although the current canister 130 is generally cylindrical and the receptacle portion 124 is circular to receive the canister, the canister may be shaped differently, for example, with a square plan form, or have an upwardly tapering shape.

While illustrative embodiments have been illustrated and described, it will be appreciated that various changes can be made therein without departing from the spirit and scope of the invention.

The embodiments of the invention in which an exclusive property or privilege is claimed are defined as follows:

1. A bedbug trap comprising:
   a base having a frustoconical outer ramp that is angled upwardly and leads to an entryway, and a frustoconical inner chute extending inwardly from the outer ramp and is angled downwardly from the entryway;
   a catch tray having a floor portion and a wall portion, wherein the catch tray is removably attachable to the base such that the floor portion of the catch tray is disposed below and spaced apart from the base chute;
   a receptacle disposed directly above the base; and
   a container configured to be supported in the receptacle and comprising a body portion and a lid portion, wherein the container is configured to provide a source of carbon dioxide gas that is expelled from the container such that it flows towards the base entryway;
   wherein the base further comprises an annular wall disposed between the ramp and the chute, and wherein the catch tray threadably engages the annular wall.

2. The bedbug trap of claim 1, wherein the container comprises an insulated container that is configured to retain dry ice.

3. The bedbug trap of claim 1, wherein the ramp defines an angle of not more than 50 degrees, and the frustoconical chute defines an angle of not less than 50 degrees.

4. The bedbug trap of claim 1, wherein the ramp defines an angle of not more than 45 degrees, and the frustoconical chute defines an angle of not less than 60 degrees.

5. The bedbug trap of claim 1, wherein the ramp comprises a textured upper surface, and the frustoconical chute comprises a smooth upper surface.

6. The bedbug trap of claim 1, wherein the base comprises (i) a lower base member that defines the ramp having upright panels that extend upwardly from the ramp, and (ii) an upper base member that is configured to engage the upright panels, wherein the entryway is defined by a spacing between the lower base member and the upper base member.

7. The bedbug trap of claim 6, wherein the upright panels define locking notches along an upper edge, and the upper base member defines locking notches along a lower edge, and wherein the upright panel locking notches are sized and shaped to lockingly engage the upper base member locking notches.

8. The bedbug trap of claim 6, further comprising a downwardly open cover that is configured to engage the base such that the base and cover enclose the container, such that an annular space is defined between the cover and the container.

9. The bedbug trap of claim 8, wherein the cover further comprises a plurality of apertures spaced about a lower portion of the cover such that a portion of the carbon dioxide gas flows outwardly through the plurality of apertures.

10. The bedbug trap of claim 8 wherein the upper base member further comprises a plurality of slots disposed over the entryway, that are positioned to facilitate flow of carbon dioxide gas from the annular space between the cover and the container to the entryway.

11. The bedbug trap of claim 8, wherein the cover further comprises a first tab and the base further comprises a second tab, wherein the first and second tabs are positioned to facilitate releasably locking the cover to the base, such that access to the container is inhibited.

* * * * *

UNITED STATES PATENT AND TRADEMARK OFFICE
CERTIFICATE OF CORRECTION

PATENT NO. : 8,402,690 B2  
APPLICATION NO. : 12/878870  
DATED : March 26, 2013  
INVENTOR(S) : Schneidmiller et al.

Page 1 of 1

It is certified that error appears in the above-identified patent and that said Letters Patent is hereby corrected as shown below:

In the Claims

| COLUMN | LINE | ERROR |
|---|---|---|
| 10 | 17 | "the base and cover" should read |
| (Claim 8, | line 3) | --the base and the cover-- |

Signed and Sealed this  
Twenty-second Day of October, 2013

Teresa Stanek Rea  
*Deputy Director of the United States Patent and Trademark Office*